United States Patent Office 2,955,930
Patented Oct. 11, 1960

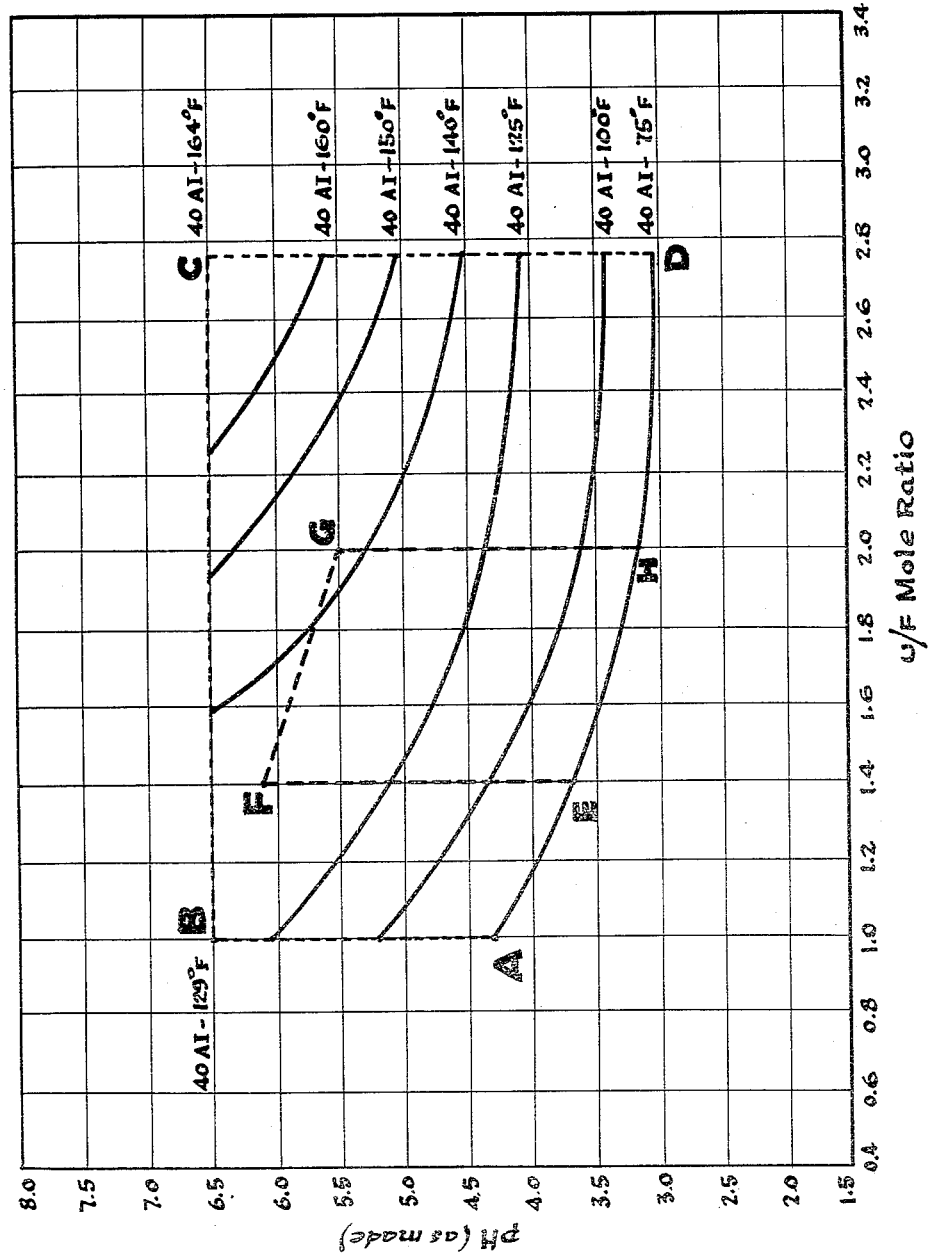

2,955,930
UREA-FORMALDEHYDE POLYMERS OF HIGH AGRONOMIC VALUE

Joseph P. Kealy, Lansing, Ill., assignor to Swift & Company, Chicago, Ill., a corporation of Illinois No Drawing. Filed Oct. 19, 1956, Ser. No. 617,114

10 Claims. (Cl. 71—29)

The present application which is a continuation-in-part of application for Urea-formaldehyde Polymers of High Agronomic Value, Serial No. 555,786, filed December 28, 1955, now abandoned, relates in general to the preparation of fertilizer materials containing urea-formaldehyde condensation products. More particularly, the invention relates to a process for condensing urea and formaldehyde together in the presence of phosphatic fertilizer substrate, preferably superphosphate or triple superphosphate, under such conditions that the resulting product is particularly suitable for use as a fertilizer.

A number of methods have been devised for supplementing the nitrogen content of fertilizer mixtures. For example anhydrous ammonia, aqua ammonia and ammoniacal solutions of urea or ammonium nitrate may be used to treat acidic superphosphates whereby to substantially increase their nitrogen content. Salts containing nitrogen in an available form are also used in the preparation of mixed fertilizers. Such salts are ammonium nitrate, sodium nitrate, ammonium sulphate and the like. Another source of available nitrogen which has become particularly popular recently is the class of compounds known as urea-formaldehyde condensation products. These condensation products are resinous in nature and are suitable as nitrogen sources since they contain nitrogen in a water-insoluble form which is not leeched out in the soil immediately following application to growing plants. They are particularly suitable for use in fertilizers since, as pointed out in the copending application of E. N. Mortenson and J. P. Kealy, Serial No. 530,416, filed August 24, 1955, now abandoned, entitled "Non-Burning Plant Food," urea-formaldehyde condensation products, unlike many chemical sources of nitrogen, show virtually no tendency to burn plant leaves through plasmolysis. Plasmolysis is encountered whenever most of the more commonly used fertilizer salts are applied to plant leaves and effects a burn or discoloration and a debilitation of the plants.

In general the accepted procedure has been to first condense the urea and formaldehyde in an aqueous solution in the fashion detailed by Clark, Yee and Love in Ind. & Eng. Chem., vol. 40, page 1,178 (1948) and thereafter admix the resin with any additional fertilizer solids required, such as superphosphates (usually ammoniated), potassium nitrate, ammonium nitrate, etc.

However, the urea-formaldehyde condensation products are more conveniently formed "in situ" at the time of the ammoniation of superphosphates. The urea and formaldehyde are charged into the mixing chamber containing the superphosphate and because of the heat which is given off in the exothermic neutralization reaction, the condensation of urea with formaldehyde is initiated. Also, the condensation products may be produced "in situ" in the presence of straight unammoniated superphosphates. Such an approach is suggested in the Davenport Patent No. 2,618,546.

Most of the urea-formaldehyde condensation products which have been made in the past however have one rather objectionable feature. They contain nitrogen in such a form that it is not sufficiently available for use by the growing plant. To be of any value to the plant, the nitrogen must be in such a form that it is susceptible to attack by the soil bacteria that normally converts organic and ammoniacal forms of nitrogen to the readily available nitrate form which is easily assimilated by plants during the course of the growing season. Workers in the field have attempted to rely upon the Clark et al. report mentioned earlier and because of this have failed to properly condense the urea and formaldehyde when preparing the resin "in situ" in the presence of fertilizer phosphatic material—in part because of the strong buffering effect of the acidic phosphatic milieu on the relatively small quantity of urea-formaldehyde material.

It is therefore an object of this invention to provide a method for the manufacture of urea-formaldehyde condensation products "in situ" in the presence of acidic phosphatic substrates which, while exhibiting the customary desirable properties associated with such resins, are further capable of supplying substantial amounts of available water-insoluble nitrogen.

It is a further object of this invention to provide a method for the "in situ" manufacture of urea-formaldehyde condensation products of high agronomic value in the presence of superphosphates, the agronomic value being designated in terms of a high availability index and a high percentage of urea nitrogen condensed to water-insoluble nitrogen.

Another object of this invention is to provide a method for substantially increasing the value of urea-formaldehyde condensation products as sources of slowly available nitrogen.

Further objects and advantages of this invention, if not specifically set forth, will become apparent to one skilled in the art during the course of the description which follows.

Broadly, acidic substrates in the presence of which it is desirable to form urea-formaldehyde condensation products in accordance with this invention are ordinary superphosphates, mono, di and tri basic, meta phosphate and other mono and di phosphates. The formation of urea-formaldehyde condensation products in situ in these materials has not been considered commercially feasible partially because the pH of the phosphate material is too low, about 2.5 for supers, for example, and extreme of low temperatures are required in order to obtain a condensed material with the proper amount of available nitrogen. But this approach may nevertheless be used since superphosphates may be ammoniated to incorporate nitrogen ingredients in the product and during such ammoniation the pH of the product is raised to the extent that it is practical to form therein urea-formaldehyde condensation products provided the temperature is carefully controlled, as will be detailed hereafter. Instead of ammoniating the phosphate, it is also possible to adjust the pH by other means, such as the addition of other alkaline materials, to a point where in situ urea-formaldehyde condensation is possible, given proper temperature control. Ordinarily, however, in the manufacture of mixed goods in accordance with this invention, solid superphosphate, mono, di or tri basic, or other phosphate material is ammoniated to incorporate the maximum amount of fixed nitrogen. The urea, either as a liquid or in solid form, may be introduced before or during ammoniation. A solution containing formaldehyde is then added and the solute condenses with the urea. It is then ordinarily necessary to cool the product before final storage in a plant pile. The cooling is necessary to obtain a condensation product of sufficient agronomic value. It is also possible, though not preferred, to employ this process without subsequently cooling, but if the product obtained is to have the desired agronomic activity, various conditions must prevail during the condensation reaction which are relatively extreme and difficult to attain and control.

The conditions prevailing at the time of this condensation reaction significantly affect the nature of the product. The pH of the mixture, the ratio of urea to formaldehyde, and the temperature of curing must be carefully correlated since all play a part in determining whether the product will have a high availability index and be in such a form (adequately condensed) that the nitrogen is slowly available over a long period of time.

By means of the teachings of this invention, it is possible to secure an in situ formed urea-formaldehyde condensation product in admixture with a phosphatic substrate in which an appreciable part of the urea nitrogen, preferably 50% or more, is condensed to the desired water-insoluble form and in which the nitrogen availability index (A.I.) as defined by the methods published in the 1955 ed. Official Methods of Analysis, Association of Official Agricultural Chemists, page 14, paragraph 232 and page 16, paragraphs 237 and 238, is at least 40 percent. A minimum availability index of 40 in urea-formaldehyde polymers has been determined by the Association of American Fertilizer Control Officials to be necessary for the polymer to release nitrogen quickly enough to be of agronomic value. This is reported in Official Publication #6 A.A.F.C.O., November 1954, paragraph No. 16, page 14. As will be more specifically pointed out below, with proper selection or correlation of the urea to formaldehyde ratio (between 1.0 and 2.75 to 1), the pH (between 3 and 6.5), and the curing temperature (the temperature at which the urea-formaldehyde condensation material is maintained for a several week period following manufacture—between 75° F. and 164° F.) both over condensation and under condensation will be avoided. The availability index of the condensed nitrogen will be found to be at least about 40 and, in the preferred embodiment of the invention, the percentage urea nitrogen condensed to water-insoluble nitrogen will be at least 50.

The single figure of the accompanying drawings graphically represents the interrelationship of the pH prevailing at the time of contact of the urea and formaldehyde, the urea to formaldehyde mol ratio and the temperature during the curing operation which must be maintained if one is to carry out the process and obtain the product of this invention. The graph will be discussed more in detail hereinafter.

More particularly, the temperature of the phosphatic mix containing urea-formaldehyde product following the initiation of the condensation reaction, the pH immediately after mixing and the ratio of urea to formaldehyde used are so interrelated that each must be considered in conjunction with the other two in order to obtain a product which is at least 40 A.I. and in which at least 50% of the urea nitrogen is condensed to water-insoluble nitrogen. The relatively high temperature ordinarily obtained at the time of the initial condensation of urea and formaldehyde, where they are condensed in situ in a fertilizer solid mixture, should be subsequently reduced if over condensation and the production of a product of low agronomic value is to be avoided. A product of low agronomic value is one in which the nitrogen is not readily attacked and decomposed by the bacteria in the soil. Where temperatures in excess of 160° F. in a fertilizer mix undergoing ammoniation are used, a temperature usually less than 160° and as low as about 75° F. is preferably obtained shortly thereafter to avoid over condensation. The pH at the time of the condensation reaction is important because at a pH above 6.5 too much of the condensation product is water-soluble. While the nitrogen in this water-soluble material nitrifies slightly slower than that in most inorganic nitrogen sources, it is not as effective and desirable as nitrogen in a properly condensed urea-formaldehyde product.

Where too low a pH, one below about 3.0 is used, the nitrogen is too well bound up and difficult of decomposition to satisfy the needs of most plants. Thus, control of the pH enables the production of a product which supplies nitrogen in a form such that it is easily converted to water-insoluble nitrogen and is not rapidly dissipated in the soil. At the same time pH control allows the formation of a product which is not so greatly condensed that it resembles the solid resin used in making solid plastic articles. Control of the pH also enables the binding up of virtually all of the urea in such manner that it is not allowed to pass directly into the soil. In order to secure the desired results where the pH and temperature of cure are carefully regulated, the ratio of urea-to-formaldehyde may be varied anywhere between about 1.0 and 2.75 to 1.

The term "formaldehyde" as used herein includes any of its forms, such as the gaseous and aqueous solutions of any concentration. Paraformaldehyde may also be used if sufficient water is added to initiate the reaction. Also suitable as a source of formaldehyde is a commercially available alkaline solution which is essentially 61% formaldehyde, 25% urea and 14% water, hereinafter referred to as "U/F Solution." It is regarded primarily as a formaldehyde source since it contains an excess of formaldehyde over urea where the relationship of one ingredient to the other in the finished product is almost always reversed, the urea being present in excess or at least in molar quantities equal to those of formaldehyde. Where this solution is used, the condensation has already proceeded to the extent of causing the formation of monomethylol urea. It is only necessary to supply proper quantities of additional urea under appropriate conditions of pH and cure temperature to obtain the properly condensed fertilizer ingredient. Another suitable source of formaldehyde is hexamethylene tetramine, 6 mols of formaldehyde combined with 10 mols of ammonia. This material breaks down in moist acidic environments, behaving thereafter like a solution of formaldehyde. Irrespective of which formaldehyde source is selected, it is essential that the urea quantity be raised to the proper molar ratio, as determined by the graph, only when the conditions of pH and cure temperature are properly under control. Undercondensation, as with the above referred to solution, can always be corrected but over condensation becomes possible as the urea quantity is increased and can only be avoided if the various conditions are carefully controlled.

The urea is preferably first mixed with any of those solid fertilizer ingredients ordinarily employed in the preparation of mixed goods containing phosphatic material. These fertilizer ingredients to which the urea is added may include superphosphates themselves, salts of potassium, hydrated lime, dolomite, coloring matter, etc. The addition of the formaldehyde may conveniently take place at the time of the introduction of the other liquid ingredients, such as liquid anhydrous ammonia or B-liquor (an approximately 30 percent solution of ammonia or commercial water solutions of ammonium nitrate and/or urea). The free ammonia performs two functions simultaneously when added to a superphosphate. It reacts with the free phosphoric acid and the monocalcium phosphate of the superphosphate, converting the former to mono- and di-ammonium phosphate and the latter to mono- and di-ammonium phosphate and dicalcium phosphate. Similar reactions occur when other phosphatic material is substituted for superphosphate. Also, sufficient heat is developed by these reactions to initiate the urea-formaldehyde condensation. Temperatures in the vicinity of 160° F. or higher are commonly encountered. The product obtained may be used either in a conventional type fertilizer (which may burn turf due to its plasmolysis effect) or it may be incorporated in a non-burning fertilizer of a type described in the aforementioned copending application. Where a burning type of product is satisfactory, ammonia alone may be sufficient to adjust the pH to the proper level. However, where a product is desired which exhibits non-burning characteristics and, as discussed in detail in the aforementioned copending application where, therefore, the ammoniation is terminated at the point at which only the stoichiometric amount of ammonia to convert the free acid and monocalcium phosphate to monoammonium phosphate and dicalcium phosphate is present (see Manual on Fertilizer Manufacture, 2nd edit. page 45, Vincent Sauchelli), the pH prevailing in the mixture of the urea adn formaldehyde is much too low for the production of a good urea-formaldehyde product. The urea-formaldehyde condensation product obtained under these conditions is over condensed and contains small amounts of available water-insoluble nitrogen and excessive amounts of unavailable nitrogen.

As a solution to the problem outlined above, it has been found that by the use of another non-ammoniacal basic material, such as calcium hydroxide (hydrated lime), calcined dolomite or magnesium oxide or other base, the pH may be adjusted upwardly so that a condensation product may be secured with better agronomic value than that obtained at lower pH levels. Table 1 below indicates the results of carefully controlling the pH of a standard superphosphate-containing fertilizer mix by the use of calcium hydroxide during the period of time the formaldehyde and urea are initially condensing one with the other in the presence of superphosphates undergoing ammoniation. All percentage figures given in the table were based upon the total weight of the mix under consideration, the pH is that prevailing in the mix several minutes after the condensation reaction and A.I. refers to the availability index of the nitrogen bound up in the U/F product after a two-week cure.

*Table 1*

| (1) Formula | (2) Lbs. Ca(OH)$_2$ Per Ton | (3) Percent NH$_3$N | (4) pH | (5) Percent WIN [1] | (6) A.I. | Percent HWIN [2] |
|---|---|---|---|---|---|---|
| 1 | 0 | 1.20 | 4.05 | 2.78 | 30.5 | 1.93 |
| 2 | 15 | 1.05 | 4.62 | 3.33 | 47.5 | 1.75 |
| 3 | 26.5 | 1.05 | 4.92 | 2.90 | 55.83 | 1.28 |
| 4 | 37.5 | 1.00 | 5.03 | 2.57 | 58.83 | 1.06 |
| 5 | 48.0 | 1.00 | 5.14 | 2.83 | 58.5 | 1.18 |

[1] Water insoluble nitrogen.
[2] Hot water insoluble nitrogen.

These urea-formaldehyde products were used to supply 4.88 units of nitrogen; a "unit" of plant food as defined in the Official and Tentative Methods of Analysis, page 901, 6th edit., 1945, published by the Association of Official Agricultural Chemists (AOAC) is 20 pounds of plant food or 1% of a ton. It may easily be seen that as the pH is raised by increasing the amount of calcium hydroxide the A.I. increases. Thus, it is possible to reduce the amount of ammonia present (see column labeled "Percent Ammonia Nitrogen" (percent NH$_3$H), Formulae 4 and 5). This reduction of NH$_3$ may be compensated for by increasing the pH through the addition of a second base. Note that all formulations subsequent to 1 have satisfactory "A.I." values. For a detailed discussion of the significance of the term "availability index" and its relation to the standard nitrification test of the Association of Official Agricultural Chemists, see the articles entitled "Chemical Method For Available Fertilizer Nitrogen in Urea-Formaldehyde," by W. A. Morgan and R. D. Kravolec, Journal of the Association of Official Agricultural Chemists, No. 3, vol. 36, August 15, 1953, P. 907.

The following example shows the preparation of a urea-formaldehyde condensation product containing complete fertilizer where ammonia alone served to provide proper pH adjustment.

EXAMPLE I

The following ingredients were tumbled in a conventional rotary mixer, the urea being admixed to the superphosphate in advance. Formaldehyde and anhydrous ammonia were sprayed in simultaneously.

| Ingredients: | Lbs. |
|---|---|
| Superphosphate (single | 1,000 |
| Anhydrous ammonia | 24 |
| Potassium nitrate | 43 |
| Potassium sulfate | 123 |
| Uera | 211 |
| Formaldehyde (37%) | 222 |
| Dolomite | 494 |

In the above information at a urea-formaldehyde mol ratio of 1.25:1 there was no pH adjustment other than that obtained by the anhydrous ammonia. Since the pH as made was 4.1, an immediate cooling was necessary to a low temperature of about 75° F. The resulting WIN after a two-week cure was 3.9 and the A.I was 42. The urea served to supply 4.88 units of nitrogen to the product (98.75 lbs.) and the percent urea N condensed to WIN was 80.

It is most important to carefully control the curing temperature after the first 24-hour period. Ordinarily, the temperature at which the initial condensation reaction takes place will be in the neighborhood of 160° F. or somewhat above since this is the temperature prevailing within a mixing chamber during an ammoniation reaction involving ammonia and a phosphate. As mentioned earlier, it is possible under certain extreme conditions of U/F mol ratio and pH to use 160° or slightly above as a curing temperature. However, this makes the production of a suitable product an extremely difficult proposition and accordingly it may be said that if, under ordinary circumstances, this temperature is allowed to exist for a substantial period of time (generally over about 24 hours depending on the U/F ratio, temperature, and pH), following the initiation of the condensation reaction, a product is obtained which is unacceptable as it will be over condensed and have a low nitrogen availability index.

One possible way of avoiding a high temperature throughout the entirety of the condensation reaction is to mix only a portion of the formaldehyde with urea, and subsequently, after cooling the substrate and urea-formaldehyde mixture, add the additional formaldehyde and complete the reaction at the lower temperature. This approach achieves proper results since a convenient way to lower the temperature of the substrate and reacting ingredients is simply to rehandle them. Rerunning the fertilizer mixture through the mixing drum at the time of the addition of the extra formaldehyde necessarily causes cooling. For example in one such test, the temperature just prior to the remixing operation was about 140° F. and was easily lowered to about 100° F. by the rehandling and remixing. Consequently, the temperature prevailing during the extended time period following contact of all the urea with the entire batch of formaldehyde was maintained at a relatively low level. If all of the formaldehyde had been added to the urea initially, and the high emergence temperature had remained unbroken for a substantial time, the water-insoluble nitrogen bound up with the urea-formaldehyde condensation product would have ultimately displayed low agronomic activity. The amount of hot water-insoluble nitrogen would have increased and the available insoluble nitrogen would have decreased. The high temperature prevailing subsequent to the first mix then was necessarily broken before the remaining portions of the formaldehyde charge were introduced.

EXAMPLE II

| 1st Mix: | Lbs./ton |
|---|---|
| Single superphosphate | 1,050 |
| Sulphate of potash | 157 |
| Anhydrous ammonia | 31 |
| Urea | 206 |
| Liquid formaldehyde (37% by weight of $CH_2O$) | 120 |
| Dolomite | 460 |
| Nel (minor element base) | 20 |
| 2nd Mix: | |
| Liquid formaldehyde 37% | 85 |
| Dye | 0.5 |

The U/F mol ratio in the first mix is equal to 2.34:1. The first mix was cured 24 hours at 125° F. In the second stage the remainder of the formaldehyde was added resulting in an over-all U/F mol ratio of 1.34:1. The mix was then cooled to 80° F. The WIN was equal to 2.50 at 50 A.I. In the above formulation the temperatures of cure are necessarily lower than where additional pH adjustment occurs when using additional lime or other basic material. The U/F mol ratio in the first mix may vary considerably. It may be as high as 6.7:1 or higher, or as low as 1.7:1 or lower.

This two-stage approach is merely one convenient method of insuring that a high temperature will not obtain for too long a period of time with all of the formaldehyde being in contact with the urea. The preferred approach as shown in the example is to mix all of the formaldehyde with the urea at once and carefully control the temperature so that the high mix temperature does not last for more than a few hours and at the most 24 hours. All of the formaldehyde may be added to all of the urea at the first stage and removed from the mixer immediately, or set aside for several hours or a day at the most, and then run through the rotary mixer a second time or otherwise cooled. The cool air passing through the interior of the mixer during the second handling causes a temperature drop to a level which does not induce the formation of the over condensed urea-formaldehyde product. Preferably, the temperature of the mix following this second mixing operation should be in the neighborhood of about 100° F. to about 140° F. depending on the U/F ratio and pH. The pile is then set aside and allowed to cure for a period of about 2 weeks and may be then sold as the A.I. and condensation level are relatively stable by this time.

To more clearly point up the danger of allowing high cure temperatures to prevail even for a relatively short period of time (24–48 hours) a series of tests were run wherein U/F condensation products were prepared under conditions such that the products would be expected to have an availability index of the desired 40, provided that the cure temperatures were properly controlled. However, in these tests temperatures somewhat higher than those required were used for limited periods of time and thereafter the products were cooled to the proper holding temperature, in this case 100°. The table which appears below, Table 2, shows results of these tests wherein the maximum time at 140° F. is shown in the left-hand column and the availability index of the condensation product obtained appears in the second column beneath each of the U/F ratios. The total curing time was, in each case, two weeks with most of the cure being effected at 100° F. The test results set out in Table 3 also show clearly that the A.I. decreases constantly even where more moderate cure temperatures (120° and 115° F.) are selected, thus further pointing up the criticality of the cure temperature.

In the two tables immediately following and in others which appear later the heading "Percent Cond." refers to the percentage of the urea nitrogen which condensed to water-insoluble nitrogen, based upon the quantity of urea nitrogen present initially. In each case, urea was used to supply a given quantity of nitrogen, 4.16 units in the tests of Table 2 and 4.88 units in the tests of Table 3. The headings "WIN" refer to units of nitrogen condensed to water-insoluble nitrogen. Accordingly, "Percent Cond." is secured by dividing "WIN" by 4.16 in Table 2 and by 4.88 in Table 3, and multiplying the quotient by 100.

Table 2

| Hours at 140° F. | U/F=1.6 | | | U/F=1.7 | | | U/F=1.8 | | |
|---|---|---|---|---|---|---|---|---|---|
| | WIN | A.I. | Percent Cond. | WIN | A.I. | Percent Cond. | WIN | A.I. | Percent Cond. |
| 0 | 2.25 | 58 | 54 | 1.80 | 62 | 43 | 1.55 | 70 | 37 |
| 5 | 2.50 | 58 | 60 | 2.25 | 54 | 54 | 2.10 | 63 | 51 |
| 10 | 2.75 | 53 | 66 | 2.45 | 55 | 59 | 2.25 | 57 | 54 |
| 15 | 2.75 | 48 | 66 | 2.40 | 55 | 58 | 2.25 | 52 | 54 |
| 24 | 2.85 | 38 | 68 | 2.65 | 49 | 64 | 2.30 | 51 | 55 |
| 36 | 2.90 | 34 | 69 | 2.65 | 45 | 64 | 2.55 | 48 | 61 |
| 48 | 2.85 | 29 | 68 | 2.80 | 35 | 67 | 2.55 | 50 | 61 |
| pH (as made) | 5.70 | | | 5.70 | | | 5.70 | | |

37% formalin used.

Table 3

EFFECT OF TIME CURE AT VARIOUS TEMPERATURES USING 37% FORMALIN

| U/F Mol Ratio | Time at Cure, Days | Temp. at Cure, ° F. | WIN | A.I. | Percent Cond. |
|---|---|---|---|---|---|
| 1.50 | 1 | 120 | 2.95 | 57 | 61 |
| | 4 | 120 | 3.33 | 53 | 68 |
| | 10 | 120 | 3.33 | 49 | 68 |
| 1.60 | 3 | 115 | 1.70 | 67 | 35 |
| | 7 | 115 | 1.85 | 60 | 38 |
| | 14 | 115 | 2.25 | 58 | 47 |

Note that where, in the results set out in Table 2, a period of about 2 days was allowed to elapse at a cure temperature of 140°, the availability index of the ultimate product dropped significantly. In the case of a U/F product having a ratio of urea to formaldehyde of 1.6 to 1 the drop was from 58 to 29, for example. Availability index drops in the vicinity of about 20–30 points were obtained in each of the other tests. Under most conditions, a drop of this magnitude would render the U/F condensate unacceptable. Accordingly, the 24 hour maximum holding period at the temperature of manufacture (or at any temperature significantly above that shown as appropriate on the graph, for that matter) while not an absolute minimum, particularly at high U/F ratios, has been selected to afford a margin of safety. As shown in the first test reported in Table 2, 24 hours at 140° where the U/F ratio is 1.6 to 1 is an absolute maximum but, as can be seen from the other tests reported there, it becomes less critical where higher U/F ratios are selected.

While it is common for the availability index to drop off to a certain extent during the two week curing period, nevertheless, the drop where the proper holding temperature obtains is by no means as significant as that obtained in the above tests. In the tests reported above in Table 3, products were manufactured which might be expected to be within the scope of this invention and the curing temperatures in each case were within the limits set forth in the graph. Note that in the first test wherein the U/F ratio was 1.5 to 1, the drop in availability index obtained was only from 57 to 53 over four days and only to 49 over 10 days. In a further series of tests, the U/F ratio selected was 1.6 to 1 and the cure temperature 115°; the A.I. drop over 4 days was only from 67 to 60 and over 14 days to 58. Thus, in each case, where a curing temperature within the desired range was used the drop was much less than that obtained where curing temperatures of 140° were used initially—even though the product was cooled thereafter. It is seen, therefore, that even a relatively limited period of time at a high cure temperature can adversely affect the product, especially where relatively low U/F mol ratios and pH's are selected.

To show the variation in conditions and urea-to-formaldehyde mol ratios which could be selected using a basic formula (given in Example I) and still secure a urea-formaldehyde condensation product having the proper availability index and sufficiently high degree of condensation, a large number of additional tests were run varying the pH's, curing temperatures and urea-to-formaldehyde mol ratios.

For each cure temperature listed the analytical results for water-insoluble nitrogen (W.I.N.) and availability index (A.I.) are arranged with respect to increasing U/F mol ratio (between 1 and 2.75 to 1), and with respect to increasing pH (as made). As can be seen, within each U/F mol ratio grouping, the A.I. increases with an increasing pH. The data obtained from these tests was sufficient to indicate the proper U/F mol ratio, pH and cure temperature to obtain a product having a minimum A.I. of 40 and a condensation of at least 50%. From the data here, the graph was prepared. The isotherms bearing cure temperatures represent the maximum temperature at any given pH or U/F mol ratio which would be expected to yield a product having the desired 40 A.I. Since an increase in pH or U/F mol ratio, where the temperature is held constant, assures a higher A.I. than that which has been set as a minimum, it may be stated that the area to the right of and above any given isotherm contains the U/F mol ratios and pH's (at the time of manufacture) which for the temperature selected will assure a product having better than a 40 A.I. level. In other words, to use the graph all one need do is select a cure temperature represented by any one of the isotherms. He may then conclude that any point in the area above and to the right of that temperature curve represents a pH and U/F mol ratio relationship which will yield a product having better than a 40 A.I., provided of course, that the cure temperature is held at this level or below. Of course, if the point is directly on the curve itself, the A.I. will be about 40. It will be noted that the curing time selected in each of the tests listed below was two weeks. It was felt most practical to base the directions for securing a product of this invention upon this time period because two weeks is a fair average of the time lapse between the manufacture and bagging and shipping fertilizer. The columns labeled "pH (as made)" contain the various pH's observed within 2 to 4 minutes after all ingredients were charged into the reaction vessel.

*Table 4*

TWO WEEKS CURE AT 75° F.

[6-10-4 grade using 37% formalin]

| Formula No. | U/F Mol Ratio | pH (as made) | pH (2 wks.) | 2 weeks | | |
|---|---|---|---|---|---|---|
| | | | | WIN | A.I. | Percent Cond. |
| 104 | 1.00 | 2.70 | 3.85 | 5.40 | 16.3 | 95 |
| 105 | 1.00 | 3.20 | 3.92 | 4.00 | 34.2 | 77 |
| 108 | 1.00 | 3.85 | 4.20 | 4.68 | 32.2 | 100 |
| 120 | 1.00 | 4.05 | 3.85 | 4.15 | 40.2 | 90 |
| 121 | 1.00 | 4.30 | 4.05 | 4.05 | 40.7 | 91 |
| 77 | 1.00 | 4.52 | 4.40 | 4.00 | 53.3 | 95 |
| 78 | 1.00 | 4.74 | 4.45 | 3.95 | 56.0 | 95 |
| 87 | 1.00 | 5.35 | 5.30 | 3.55 | 67.3 | 85 |
| 109 | 1.25 | 3.95 | 3.80 | 3.75 | 40.8 | 78 |
| 90 | 1.25 | 4.50 | 4.30 | 3.20 | 53.8 | 68 |
| 126 | 1.60 | 3.60 | 3.73 | 2.48 | 45.8 | 50 |
| 94 | 1.60 | 3.90 | 4.05 | 2.08 | 53.2 | 85 |
| 101 | 1.60 | 4.20 | 4.10 | 2.03 | 56.0 | 40 |
| 127 | 2.00 | 3.22 | 3.70 | 2.85 | 37.7 | 55 |
| 110 | 2.00 | 3.55 | 3.68 | 1.68 | 51.7 | 33 |
| 91 | 2.00 | 3.80 | 3.95 | 1.45 | 57.8 | 30 |
| 92 | 2.00 | 3.90 | 3.92 | 1.25 | 55.2 | 26 |
| 100 | 2.30 | 3.58 | 3.85 | 1.45 | 54.7 | 28 |
| 93 | 2.30 | 3.90 | 3.90 | 1.00 | 59.8 | 22 |
| 125 | 2.38 | 3.17 | 3.51 | 1.73 | 43.0 | 33 |
| 116 | 2.75 | 2.90 | 3.60 | 1.78 | 36.7 | 32 |
| 122A | 2.75 | 3.10 | 3.53 | 1.73 | 40.8 | 32 |
| 80 | 2.75 | 3.10 | 3.60 | 1.75 | 43.2 | 32 |
| 122B | 2.75 | 3.20 | 3.75 | 1.83 | 41.2 | 33 |
| 88 | 2.75 | 3.30 | 3.65 | 1.65 | 42.3 | 31 |
| 79 | 2.75 | 3.50 | 3.75 | 1.00 | 52.7 | 21 |

*Table 5*

TWO WEEKS CURE AT 100° F.

[6-10-4 grade using 37% formalin]

| Formula No. | U/F Mol Ratio | pH (as made) | pH (2 wks.) | WIN | A.I. | Percent Cond. |
|---|---|---|---|---|---|---|
| 113 | 1.00 | 5.31 | 5.00 | 3.90 | 36 | 93 |
| 133 | 1.00 | 5.45 | 5.23 | 3.68 | 40.5 | 88 |
| 147 | 1.00 | 5.45 | 5.61 | 3.10 | 61.2 | 73 |
| 99 | 1.00 | 5.70 | 5.65 | 3.55 | 52.7 | 85 |
| 146 | 1.25 | 4.70 | 4.58 | 3.38 | 47.5 | 80 |
| 145 | 1.65 | 4.16 | 4.14 | 2.53 | 48.2 | 53 |
| 129 | 2.00 | 3.72 | 3.80 | 2.45 | 43.3 | 49 |
| 119 | 2.00 | 4.00 | 3.77 | 2.03 | 48.5 | 43 |
| 144 | 2.40 | 3.45 | 3.78 | 2.10 | 42.7 | 40 |
| 143 | 2.75 | 3.40 | 3.62 | 1.83 | 38.7 | 34 |
| 142 | 2.75 | 3.50 | 3.85 | 1.60 | 39.5 | 30 |
| 128 | 2.75 | 3.50 | 3.60 | 1.73 | 49.7 | 25 |
| 117 | 2.75 | 3.68 | 3.70 | 1.70 | 45.5 | 33 |
| 103 | 2.75 | 4.00 | 4.02 | 1.25 | 54.7 | 25 |
| 98 | 2.75 | 4.28 | 4.02 | 1.00 | 89.0 | 21 |

*Table 6*

TWO WEEKS CURE AT 125° F.

[6-10-4 grade using 37% formalin]

| Formula No. | U/F Mol Ratio | pH (as made) | pH (2 wks.) | WIN | A.I. | Percent Cond. |
|---|---|---|---|---|---|---|
| 138 | 1.00 | 5.80 | 6.20 | 3.95 | 25.8 | 95 |
| 152 | 1.00 | 6.10 | 6.61 | 3.23 | 37.7 | 77 |
| 123 | 1.00 | 6.15 | 6.54 | 2.60 | 54.7 | 62 |
| 124 | 1.00 | 6.35 | 6.58 | 2.35 | 50.2 | 56 |
| 153 | 1.00 | 6.35 | 6.80 | 2.00 | 59.7 | 48 |
| 171 | 1.60 | 4.92 | 4.28 | 2.88 | 45.7 | 68 |
| 170 | 1.60 | 5.17 | 4.50 | 2.90 | 44.5 | 69 |
| 136 | 2.00 | 4.15 | 3.93 | 2.35 | 29.7 | 53 |
| 137 | 2.00 | 4.40 | 4.09 | 2.45 | 34.5 | 54 |
| 150 | 2.00 | 4.40 | 4.20 | 2.50 | 43.2 | 53 |
| 151 | 2.00 | 4.75 | 4.40 | 2.43 | 52.3 | 50 |
| 168 | 2.40 | 4.20 | 4.02 | 2.13 | 43.3 | 45 |
| 169 | 2.40 | 4.30 | 4.10 | 2.05 | 45.0 | 42 |
| 132 | 2.75 | 3.95 | 3.94 | 1.95 | 33.3 | 39 |
| 149 | 2.75 | 4.10 | 4.15 | 1.83 | 43.2 | 37 |
| 148 | 2.75 | 4.23 | 4.15 | 1.75 | 42.5 | 36 |

Table 7
TWO WEEKS CURE AT 140° F.
[6-10-4 grade using 37% formalin]

| Formula No. | U/F Mol Ratio | pH (as made) | pH (2 wks.) | WIN | A.I. | Percent Cond. |
|---|---|---|---|---|---|---|
| 115 | 1.50 | 6.50 | 6.60 | 2.95 | 36.0 | 71 |
| 166 | 1.60 | 6.45 | 6.78 | 2.93 | 41.7 | 70 |
| 167 | 1.65 | 6.45 | 6.07 | 2.60 | 42.0 | 62 |
| 96 | 1.70 | 6.55 | 6.72 | 2.08 | 60.5 | 50 |
| 95 | 1.90 | 6.60 | 6.80 | 1.75 | 62.5 | 42 |
| 141 | 2.00 | 5.26 | 4.70 | 2.28 | 43.0 | 55 |
| 165 | 2.00 | 5.30 | 5.05 | 2.35 | 37.2 | 56 |
| 140 | 2.00 | 5.62 | 4.77 | 2.25 | 42.0 | 54 |
| 164 | 2.00 | 5.68 | 5.48 | 2.33 | 45.3 | 55 |
| 135 | 2.00 | 6.00 | 5.61 | 2.25 | 47.7 | 54 |
| 162 | 2.40 | 4.75 | 4.78 | 2.10 | 43.3 | 51 |
| 163 | 2.40 | 5.08 | 5.10 | 1.98 | 51.5 | 47 |
| 131 | 2.75 | 4.24 | 4.30 | 1.83 | 29.0 | 38 |
| 134 | 2.75 | 4.52 | 4.52 | 1.80 | 38.3 | 38 |
| 161 | 2.75 | 4.60 | 4.68 | 1.80 | 45.7 | 39 |
| 118 | 2.75 | 4.70 | 4.37 | 1.65 | 45.4 | 40 |
| 102 | 2.75 | 5.10 | 4.78 | 1.63 | 58.3 | 39 |
| 97 | 2.75 | 4.95 | 4.95 | 1.60 | 55.3 | 38 |

Table 8
TWO WEEKS CURE AT 160° F.
[6-10-4 grade using 37% formalin]

| Formula No. | U/F Mol Ratio | pH (as made) | pH (2 wks.) | WIN | A.I. | Percent Cond. |
|---|---|---|---|---|---|---|
| 95 | 1.90 | 6.60 | 7.00 | 2.28 | 38.7 | 55 |
| 114 | 2.05 | 6.50 | 6.72 | 2.35 | 33.0 | 56 |
| 156 | 2.20 | 6.50 | 6.90 | 2.05 | 50.2 | 49 |
| 157 | 2.35 | 6.48 | 7.00 | 2.00 | 44.3 | 48 |
| 159 | 2.50 | 6.00 | 6.68 | 2.03 | 41.0 | 48 |
| 158 | 2.50 | 6.25 | 6.80 | 1.90 | 48.8 | 45 |
| 102 | 2.75 | 5.10 | 5.85 | 1.75 | 30.7 | 42 |
| 97 | 2.75 | 5.42 | 5.95 | 1.70 | 34.2 | 41 |
| 155 | 2.75 | 5.65 | 6.30 | 1.68 | 36.0 | 40 |
| 154 | 2.75 | 5.83 | 6.05 | 1.70 | 44.7 | 40 |
| 130 | 2.75 | 5.97 | 5.68 | 1.75 | 45.0 | 42 |
| 111 | 2.75 | 6.40 | 6.80 | 1.70 | 46.3 | 41 |
| 160 | 2.75 | 6.53 | 7.10 | 1.98 | 51.5 | 47 |

Table 9
TWO WEEKS CURE AT VARIOUS TEMPERATURES
[6-10-4 grade using 37% formalin]

| Formula No. | U/F Mol Ratio | pH (as made) | pH (2 wks.) | WIN | A.I. | Cure Temp., ° F. | Percent Cond. |
|---|---|---|---|---|---|---|---|
| 83 | 1.00 | 6.50 | 6.70 | 2.75 | 63.3 | 123 | 66 |
| 112 | 1.00 | 6.50 | 6.60 | 2.78 | 38.5 | 130 | 67 |
| 139 | 2.75 | 6.48 | 6.71 | 1.65 | 31.7 | 167 | 40 |
| 111 | 2.75 | 6.40 | 7.00 | 1.83 | 23.3 | 180 | 44 |
| 84 | 2.75 | 6.55 | 6.70 | 1.85 | 18.7 | 200 | 44 |

Table 10
TWO WEEK CURE AT VARIOUS TEMPERATURES ON VARIOUS GRADES USING OTHER THAN 37% FORMALIN

| Formula No. | Grade | CH₂O Source | U/F Mol Ratio | pH | WIN | A.I. | Cure Temp., ° F. |
|---|---|---|---|---|---|---|---|
| 84-3 | 10-5-5 | U/F Solution | 1.6 | 5.85 | 4.60 | 45 | 125 |
| 84-4 | 10-5-5 | U/F Solution plus Para formaldehyde | 1.5 | 5.50 | 4.75 | 40 | 86 |
| 84-5 | 10-6-4 | U/F Solution | 1.6 | 5.70 | 5.10 | 40 | 125 |
| 84-6 | 10-6-4 | do | 1.8 | 5.70 | 4.50 | 36 | 140 |
| 82-5 | 6-10-4 | do | 1.6 | 5.40 | 2.50 | 44 | 125 |
| PG 30 | 12-12-12 | U/F Solution plus Paraformaldehyde | 1.4 | 5.00 | 6.70 | 49 | 120 |
| PG 36 | 12-12-12 | Hexamethylene tetramine | 1.6 | 4.10 | 5.45 | 47 | 86 |
| PG 36a | 12-12-12 | do | 1.6 | 4.10 | 6.25 | 37 | 100 |
| PG 36b | 12-12-12 | do | 1.6 | 4.10 | 6.25 | 31 | 120 |
| PG 40 | 12-12-12 | U/F Solution | 1.4 | 4.40 | 7.95 | 40 | 100 |
| PG 42 | 12-12-12 | do | 1.6 | 4.03 | 6.05 | 40 | 115 |
| PG 43 | 12-12-12 | do | 1.6 | 4.20 | 3.30 | 43 | 86 |
| PG 44 | 12-12-12 | do | 1.6 | 5.75 | 5.80 | 42 | 125 |

When material taken from Tables 4–8 and 10 above showing a product having about a 40 A.I. level is plotted with the ordinate carrying the pH values and the abscissa the urea-to-formaldehyde mol ratios, the family of curves (one curve representing each temperature) shown in the graph is obtained. This graph shows all of the important manufacturing conditions for securing a product having the desired minimum availability index. At a cure temperature of 164° there is virtually only one set of conditions which is of any importance in manufacturing a proper U/F product; a U/F mol ratio of 2.75 to 1 and a pH of 6.5. With decreasing cure temperatures the usable conditions increase in number until, at the lowermost practical cure temperature, 75° F., the entire area bounded by A,B,C,D designates U/F mol ratio-pH interrelationships which yield the desired product; one having at least a 40 A.I. The various limits have been chosen for the following reasons:

The lowermost urea-to-formaldehyde ratio (1.0 to 1.0) was chosen since the cost of formaldehyde is high relative to the other ingredients. It would be uneconomical to produce the U/F material for use in a fertilizer at U/F mol ratios much below 1.0 to 1.0 as long as the U/F material secured at higher ratios is agronomically satisfactory. Also, in the U/F mol ratio range of between .5 and 1.0 to 1.0, the 40 A.I temperature line rises very sharply and the additional area obtained representing usable conditions is quite small—leaving little leeway in pH above the selected temperature line.

The upper urea-to-formaldehyde mol ratio (2.75 to 1) was selected since at this point the percentage of the urea converted to water-insoluble nitrogen ranges generally much lower than the 50% preferred.

The uppermost pH limit (6.5) was selected because, as pointed out earlier, the U/F condensates of this invention are most economically made in situ with phosphatic fertilizers and preferably at the time of the ammoniation of superphosphates. When the pH of a superphosphate is raised too high, reversion of various ingredients of the super to unavailable forms is encountered—representing a loss.

The lowermost curing temperature (75° F.), was selected because it is neither practical nor economical to cool much below this temperature. Also, a condensate formed at such a low temperature might thereafter be stored at a higher temperature, for example 90° F., for an extended time after being sold and this would cause further condensation of the original product, thus lowering its availability index. Even where a temperature of 75° F. is used, the product is not as stable as one prepared where a higher curing temperature is employed and, accordingly 75° F. is by no means the most desirable temperature for commercial use. Urea-formaldehyde products formed at the higher temperatures, cured for from 1 to 3 weeks and thereafter cooled are relatively stable. For example, urea-formaldehyde materials cured at 100° F. to 125° F. for two weeks showed only about a 4 A.I. drop after six months at 70° F. to 85° F. storage.

A reading of the graph therefore indicates that the U/F mol ratios and pH's (as made) are limited and defined by the cure temperature used or encountered. For example, where a cure temperature of 164° F. is used, pH must be about 6.5 and the urea-to-formaldehyde mol ratio about 2.75. Where a cure temperature of 160° F. is used, all pH's and U/F mol ratio combinations bounded by the pH line of 6.5, the U/F mol ratio lines of 2.25 and 2.75 and the 40 A.I.-160° F. line may be employed. Where a cure temperature of 150° F. is selected, one may use all pH's and U/F mol ratios bounded by the pH line of 6.5, the U/F mol ratio lines of 1.95 and 2.75 and the 40 A.I.-150° F. line. Where a cure temperature of 140° F. is selected, all pH and U/F mol ratio combinations bounded by the line pH 6.5, the U/F mol ratio of lines 1.58 and 2.75 and the 140°-40 A.I. line are acceptable. For a cure temperature of 125° F. these conditions become the pH and U/F mol ratio combinations bounded by the pH line of 6.5, the U/F mol ratio lines of 2.75 and 1.0 and the 125°-40 A.I. line. In the case of 100° F. as a curing temperature, the pH and U/F mol ratio combinations fall within the pH line of 6.5, the U/F mol ratio lines of 1.0 and 2.75 and the 40 A.I.-100° F. line. Finally, in the case of a cure temperature of 75°, the conditions are all pH and U/F mol ratios bounded by the pH line of 6.5, the U/F mol ratio lines of 1.0 and 2.75 and the 40 A.I.-75° F. line. Obviously, for any other temperature which one might select it is possible using information presently in the graph to draw an addition to the family of curves given. The new line would represent a new temperature and be properly spaced from the lines on either side of it, depending on the proximity of the temperature selected to that represented by any of the lines already plotted. Given this new temperature line, one may read directly from the graph the conditions which must be maintained if a product of at least 40 A.I. is to be obtained.

The 40 A.I lines given for each cure temperature, of course, represent the minimum conditions of pH and U/F mol ratio which one might possibly use and still obtain the desired 40 A.I. product for the water-insoluble nitrogen portion of the U/F material. As a practical matter, however, it is most desired that the pH used be about 1 point above the 40 A.I. temperature line for a U/F mol ratio ranging from 1.0 up to about 2.75. This insures a higher than 40 A.I., usually in the range 50 to 60.

Generally, it may be stated by way of simplification that from the standpoint of the product's A.I. the preferred conditions at a given temperature fall to the right of and below the lines EF and FG respectively, the temperature used being 20 to 40 degrees below the maximum which the graph would indicate as permissible, the pH being below 5.5 and the mol ratio being 1.4 to 1 or greater. Another consideration in delimiting the preferred area on the larger graph is the percentage of condensation of the total urea nitrogen to water-insoluble nitrogen. As long as one selects conditions to the left of and above the lines GH and HE respectively, it may be predicted with reasonable certainty that the condensation product secured will be at least 50% condensed. Referring to tables 4–8 it will be seen that:

At a 75° F. cure, a mol ratio of 2. and a pH of 3.2, the percent urea nitrogen condensed is 55;

At 100° F. cure, a ratio of 2. and a pH of 3.72, the percent urea nitrogen condensed is 49;

At 125° F., a ratio of 2. and a pH of 4.75, the percent urea nitrogen condensed is 50; and At 140° F., a ratio of 2.4 and a pH of 4.75, the percent urea nitrogen condensed is 51.

Therefore the parallelogram EFGH provides a safe margin both with respect to availability index of the nitrogen in the condensation product and the percentage of urea nitrogen condensed to water-insoluble nitrogen. The one will be in excess of 40 (A.I.) and the other in excess of 50 (percent Cond.). Thus it is preferred to use a U/F ratio ranging between 1.4 and 2.0 to 1.0 (and most preferably a pH about 1 above the minimum pH usable for any given temperature to provide an extra margin of safety) such temperature preferably ranging between 75° F. and 115° F. The 75° F. minimum is selected in part because lower temperatures necessitate the use of refrigeration equipment for curing throughout a fair portion of the year. Accordingly, from the standpoint of ease of operation, a practical minimum curing temperature of 90° F. is recommended. Most preferred is pH 5.0 immediately following making, a U/F ratio of 1.6 to 1.0 and a storage cure temperature of about 100° F. for at least one week and preferably two.

The improved results reflected in increased A.I. levels due to decreased curing temperatures can be seen in Table 9 wherein data is set forth showing results of curing two types of U/F products (different U/F ratios) at varying temperatures. Note the decrease in A.I. obtained as cure temperatures were increased.

An improved product of the type set forth in the aforementioned application to Mortenson et al. covering "Non-Burning Plant Food" may be prepared by carefully governing the manner in which the pH of the acidic phosphate substrate (generally and preferably a superphosphate) is raised to the proper level as shown in Example III. If such non-burning plant foods are to be prepared using ammoniated superphosphate and charging the urea and formaldehyde directly into the container in which the ammoniation reaction is taking place, the pH necessary to secure the proper condensation and A.I. in the urea-formaldehyde product may be rather high. As pointed out in the aforesaid Mortenson and Kealy application, the quantity of the ammonia allowed to contact superphosphates must be kept at a relatively low level if the production of salts which burn green leafy plants is to be avoided. At most, the ammonia must be reacted only stoichiometrically with the free phosphoric acid and monocalcium phosphate in superphosphate to convert these to monoammonium phosphate and dicalcium phosphate. If this ammoniation reaction is not terminated at precisely this point (or before), ammonium sulfate or diammonium phosphate, both of which burn green leafy plants, will be formed. Accordingly, beyond this point ammonia, the customary material used to raise the pH, must be no longer utilized and another non-ammoniacal soluble base, preferably a material such as calcium hydroxide (hydrated lime) calcined dolomite or magnesium oxide must be used in its place. In other words, any material that is nontoxic to plants may be used to raise the pH (other than an ammoniacal material) provided that the base selected does not react with any of the other ingredients present in the mix to form a burning compound. Reference to the tables in the Mortenson et al. application indicates which salts may be formed without encountering a product which tends to cause plasmolysis.

EXAMPLE III

Results of a run using an appropriate set of conditions for a product having a urea-to-formaldehyde ratio of 1.53:1 and a pH at the time of manufacture of 4.85 where the extended curing temperature was reduced to about 100° F. (time of cure 14 days) follow. The product was cooled immediately after mixing. The water insoluble nitrogen level (WIN) was 2.67 and the availability index 57.3. The percent of urea nitrogen which was WIN (that percent condensed) was 64.5 percent and the urea was used to supply 4.15 units of nitrogen.

| Ingredients: | Lbs./Ton |
|---|---|
| Superphosphate | 1010 |
| Anhydrous ammonia | 36.5 |
| Potassium sulfate | 115 |
| Potassium nitrate | 43 |
| Hydrated lime (or calcined dolomite) | 25 |
| Dolomite | 469 |
| Urea | 185 |
| Formaldehyde (37% $CH_2O$) | 156 |
| | 2039.5 |

The various ingredients were mixed in the fashion of those of Example I.

The invention also contemplates the use of any suitable phosphatic substrate including various mono and di phosphates and meta phosphates. Preferably the urea-formaldehyde condensation product is prepared at the time when the ammoniation of a normal or triple superphosphate is taking place. This provides an easy method for raising the pH to an acceptable level (due to the presence of excess ammonia). If ammonia alone is used to raise the pH to a relatively high level, any hope of securing a product which, as defined by the aforementioned application of Mortenson and Kealy, is non-burning, must be dispensed with. Large quantities of ammonia necessarily result in the production of salts which burn green leafy plants. However, if a non-burning product is desired and if all of the ingredients are selected from those recommended in the Mortenson and Kealy application, the obtaining of such a product may be assured by terminating the ammoniation of the superphosphate at the stoichiometric level previously described. Beyond this point, non-ammoniacal base materials of the type described should be employed to raise the pH to a higher level. The temperature desired may be obtained through any one of several methods. Most conveniently, the product may be manufactured with all of the urea being contacted with all of the formaldehyde at one point and the mix, after being removed from the mixing chamber, having its temperature broken in any convenient fashion such as by immediate cooling or by a rerun through the mixer within a period of no more than 24 hours. Sufficient fresh air is flushed through so as to cause the mixture temperature to drop substantially below the initial reaction temperature. As a further safeguard, the addition of a portion of the formaldehyde to the urea may be held off until the second mixing step. This will insure that over condensation does not take place simply because the necessary formaldehyde is not present at the time when high temperatures prevail.

It will be remembered that it was pointed out above that any given minimum curing temperature may be exceeded for a short period of time, about 24 hours on the average, without adversely affecting the product to too great a degree. Accordingly, where the appended claims refer to curing (for one week) at a temperature "no greater than" a given minimum, it is not intended to exclude from their coverage such short time, high temperature treatment. All that is required under ordinary conditions is that the excessive temperatures not be allowed to prevail for longer than about 24 hours in order to yield the desired product.

Also, the claims refer to curing periods of one week. As pointed out earlier, curing times ordinarily range between one and three weeks. However, after about one week, a reasonable degree of product stability is obtained—the A.I. may drop off to a certain extent thereafter, but usually not sufficiently to render the product unacceptable.

Obviously, many modifications and variations of the invention hereinbefore set forth may be made without departing from the spirit and scope thereof, and therefore only such limitations should be imposed as are indicated in the appended claims.

I claim:
1. A process for the manufacture of a urea-formaldehyde condensation product in the presence of a substantially dry fertilizer solids substrate which comprises: contacting said urea and said formaldehyde in the presence of said fertilizer solids substrate at a pH of between about 4.15 and 5, said urea and said formaldehyde being present in mol ratios of between about 1.7 and 6.7 mols urea to 1 mol formaldehyde; cooling the mixture so formed within about 24 hours to a temperature less than about 100° F. and contacting said mixture with sufficient additional formaldehyde to adjust the urea to formaldehyde mol ratio to between about 1.0 and 2.75 mols urea to 1 mol formaldehyde; and allowing said mixture to cure whereby to produce a mixed chemical fertilizer having a urea-formaldehyde condensation product as a source of water-insoluble nitrogen, said urea-formaldehyde product having a water-insoluble nitrogen availability index of at least about 40.

2. A process for the manufacture of a urea-formaldehyde condensation product in the presence of a substantially dry fertilizer solids substrate which comprises: contacting said urea and said formaldehyde in the presence of said fertilizer solids substrate at a pH of between about 3.5 and 6.5, said urea and said formaldehyde being present in mol ratios of between about 1.7 and 6.7 mols urea to 1 mol formaldehyde; cooling the mixture so formed to a temperature less than about 160° F.; contacting said mixture with sufficient additional formaldehyde to adjust the urea to formaldehyde mol ratio to between about 1.0 and 2.75 mols urea to 1 mol formaldehyde; and allowing said mixture to cure whereby to produce a mixed chemical fertilizer having a urea-formaldehyde condensation product as a source of water-insoluble nitrogen, said urea-formaldehyde product having a water-insoluble nitrogen availability index of at least about 40.

3. A process for the manufacture of a urea-formaldehyde condensation product in the presence of a substantially dry solid phosphatic fertilizer substrate which comprises: reacting urea and formaldehyde in the presence of said phosphatic substrate at a pH of between about 3.0 and 6.5, said urea and formaldehyde being present in mol ratios of between about 1.0 and 2.75 to 1; before about 24 hours thereafter adjusting the temperature of the mixture so formed to between about 75° F. and 164° F.; and allowing said mixture at said temperature to cure, whereby to produce a substantially dry mixed chemical fertilizer having a urea-formaldehyde condensation product as a source of water-insoluble nitrogen, said urea-formaldehyde product having a water insoluble nitrogen availability index of at least about 40.

4. In a process wherein a substantially dry superphosphate material is ammoniated and simultaneously therewith urea and formaldehyde are contacted to form a substantially dry fertilizer mixture containing a urea-formaldehyde condensation product, the improvement which comprises: adding sufficient ammoniacal material to said superphosphate to satisfy the stoichiometric requirements for just converting the free phosphoric acid and monocalcium phosphate of said superphosphate to monoammonium phosphate and dicalcium phosphate; adjusting the pH of said superphosphate material to within the range of about 3.0 to 6.5 by the addition thereto of an inorganic, non-ammoniacal soluble base that is nontoxic to plants and that will not react with any of the other ingredients present in the mixture to form a burning compound; reacting said urea and formaldehyde in mol ratios of between about 1.0 and 2.75 to 1; before about 24 hours thereafter adjusting the temperature of the mixture so formed to between about 75° F. and 160° F. and allowing said fertilizer mixture at said temperature to cure whereby to produce a substantially dry mixed chemical fertilizer having non-burning properties and having a urea-formaldehyde condensation product therein as a source of water-insoluble nitrogen, said urea-formaldehyde condensation product displaying a water-insoluble nitrogen availability index of at least about 40.

5. In a process wherein a substantially dry superphosphate material is ammoniated and simultaneously therewith urea and formaldehyde are contacted to form a substantially dry fertilizer mixture containing a urea-formaldehyde condensation product, the improvement which comprises: adding sufficient ammoniacal material to said superphosphate to satisfy the stoichiometric requirements for just converting the free phosphoric acid and monocalcium phosphate of said superphosphate to monoammonium phosphate and dicalcium phosphate; adjusting the pH of said superphosphate material to within the range of about 3.2 to 5.5 by the addition thereto of an inorganic non-ammoniacal soluble base that is nontoxic to plants and that will not react with any of the other ingredients present in the mixture to form a burning compound; reacting said urea and formaldehyde in mol ratios of between about 1.4 and 2.0 to 1; before about 24 hours thereafter adjusting the temperature of the mixture so formed to between about 75° and 140° F. and allowing said fertilizer mixture at said temperature to cure whereby to produce a substantially dry mixed chemical fertilizer having non-burning properties and having a urea-formaldehyde condensation product therein as a source of water-insoluble nitrogen, said urea-formaldehyde condensation product displaying a water-insoluble nitrogen availability index of at least about 40.

6. A method of compounding a urea-formaldehyde condensation product for use in substantially dry mixed fertilizers in the presence of a substantially dry solid phosphatic substrate wherein the Availability Index of said urea-formaldehyde condensation product is at least about 40, comprising: selecting a product curing temperature from the family of curves of the figure; reacting urea with formaldehyde in the presence of said solid phosphatic substrate; adjusting the pH and the mol ratio of urea to formaldehyde so as to be represented by a point within the area to the right of and above the line representing the curing temperature selected and within the area A B C D of said figure; and thereafter curing the product so formed for at least about one week at no greater than said selected curing temperature.

7. The method of claim 3 wherein the said condensation product is formed in the presence of a superphosphate substrate undergoing ammoniation.

8. A method for compounding a urea-formaldehyde condensation product for use in substantially dry mixed fertilizers, said product having an Availability Index of at least about 40 comprising: reacting in the presence of a substantially dry solid phosphatic fertilizer substrate urea with formaldehyde in a mol ratio of 1.6 to 1.0; adjusting the pH to about 5.0; and thereafter curing the product so formed for a period of at least about one week at a temperature at least about 75° F. and not in excess of about 100° F.

9. The method of claim 8 wherein the said condensation product is formed in the presence of a superphosphate substrate undergoing ammoniation.

10. In the manufacture of a substantially dry mixed fertilizer, the steps comprising forming a tumbling bed of substantially dry phosphatic fertilizer solids, contacting said solids with urea, formaldehyde, and an ammoniacal material, in proportions such that the ratio of urea to formaldehyde will be between about 1.0 to 1 and 2.75 to 1 and the pH of the resilient mixture will be within the range of 3.0 to 6.5 whereby the phosphatic solids will be ammoniated and a urea-formaldehyde condensation reaction will be initiated on the substrate of solid fertilizer ingredients, adjusting the temperature to between about 75 and 164° F. and correlating the temperature in said tumbling bed of solids with the urea to formaldehyde ratio and the pH of the mixture to avoid immediate completion of the condensation reaction, and thereafter allowing said condensation reaction to go to completion whereby the condensation product so formed has a nitrogen availability index of at least about 40.

References Cited in the file of this patent

UNITED STATES PATENTS

| | | |
|---|---|---|
| 1,953,419 | MacIntire | Apr. 3, 1934 |
| 2,766,283 | Darden | Oct. 9, 1946 |
| 2,618,546 | Davenport | Nov. 18, 1952 |
| 2,827,368 | Mortenson | Mar. 18, 1958 |

UNITED STATES PATENT OFFICE
CERTIFICATE OF CORRECTION

Patent No. 2,955,930                          October 11, 1960

Joseph P. Kealy

It is hereby certified that error appears in the printed specification of the above numbered patent requiring correction and that the said Letters Patent should read as corrected below.

Column 5, line 11, for "adn" read -- and --; line 59, for "$NH_3H$" read -- $NH_3N$ --; column 6, line 9, in the table, first line thereof, for "(single" read -- (single) --; same column 6, line 13, in the table, fifth line thereof, for "Uera" read -- Urea --; column 10, Table 5, sixth column, last line thereof, for "89.0" read -- 59.0 --; column 18, line 23, for "resilient" read -- resultant --.

Signed and sealed this 4th day of April 1961.

(SEAL)
Attest:    ERNEST W. SWIDER

~~XXXXXXXXXX~~
Attesting Officer

ARTHUR W. CROCKER
                                              Acting Commissioner of Patents